United States Patent [19]
Jabr

[11] Patent Number: 5,861,981
[45] Date of Patent: Jan. 19, 1999

[54] OPTICAL AMPLIFIER HAVING DYNAMICALLY SHAPED GAIN

[75] Inventor: Salim N. Jabr, Mountain View, Calif.

[73] Assignee: Ditech Corporation, Sunnyvale, Calif.

[21] Appl. No.: 915,129

[22] Filed: Aug. 20, 1997

[51] Int. Cl.$^6$ .............................. H01S 3/22; H01S 3/091; G02B 6/26

[52] U.S. Cl. .................... 359/341; 359/134; 359/345; 372/6; 372/70

[58] Field of Search .................................. 359/134, 160, 359/337, 341, 345; 372/6, 70

[56] References Cited

U.S. PATENT DOCUMENTS

| | | | |
|---|---|---|---|
| 4,140,978 | 2/1979 | Bischel et al. | 372/70 |
| 4,215,320 | 7/1980 | Chang | 372/70 |
| 4,375,689 | 3/1983 | Taylor et al. | 372/70 |
| 5,022,041 | 6/1991 | Jacobs | 372/70 |
| 5,027,079 | 6/1991 | Desurvire et al. | 359/337 |
| 5,050,949 | 9/1991 | DiGiovanni et al. | 359/341 |
| 5,088,095 | 2/1992 | Zirngibl | 372/6 |
| 5,253,104 | 10/1993 | Delavaux | 359/341 |
| 5,351,251 | 9/1994 | Hodgson | 372/4 |
| 5,557,442 | 9/1996 | Huber | 359/179 |
| 5,684,590 | 11/1997 | Sanders et al. | 372/32 |

OTHER PUBLICATIONS

Clesca, "Flat–gain Amplifiers and Transmission in WDM Networks" Jul., 1996 FA–1 Optical Society of America and IEEE's Optical Amplifiers and Their Applications Seminar, pp. 54–57.
Desurvire, E.; Jour. of Lightwave Tech., vol. 8, #10, Oct. 1990, pp. 1517–1527.
Ivanenko et al Sav. Journ.of Quant. Elect., vol. 11, #1, pp. 57–61, Jan. 1981; Abstract Only Herewith.
Soarer, O.P. D., Proc. of NATO ASI, vol. 31, pp. 813–824; Abst. Only Herewith.
Peterson et al, Optics Communications, vol. 134, N 1–6, Jan. 15, 1997, pp. 155–160; Abst. Only Herewith.

*Primary Examiner*—Nelson Moskowitz
*Attorney, Agent, or Firm*—Douglas J. Crisman; Flehr Hohbach Test Albritton & Herbert LLP

[57] ABSTRACT

A system and method are disclosed for adjusting the gain profile of an optical amplifier including a pump laser and an active gain element by selectively controlling the electron populations of at least one Stark sublevel of the electronic energy levels of the optical amplifier's active gain element. By dynamically controlling the electron populations of selected Stark sublevels the gain profile of the active gain element can be flattened. In a first method for controlling electron populations two-photon transitions are initiated between a pair of Stark sublevels of the same energy manifold of the active gain element. Two-photon transitions are stimulated by two additional pump lasers operating at wavelengths whose difference approximates the energy difference in the pair of Stark sublevels between which electrons are to be moved. In a second method for controlling electron populations single-photon transitions are initiated between a pair of Stark sublevels of different energy manifolds of the active gain element. Single-photon transitions are stimulated by an additional pump laser operating at a frequency difference that approximates the difference in the pair of energy levels. Alternatively, single photon transitions are stimulated by operating the amplifier's pump laser at a wavelength selected so as to simultaneously cause electron transitions from the ground level of the active gain element to one of the higher energy levels and electron transitions from a selected Stark sublevel of the upper laser level to a yet higher energy level.

25 Claims, 6 Drawing Sheets

OPTICAL AMPLIFIER HAVING DYNAMICALLY SHAPED GAIN

BACKGROUND OF THE INVENTION

The introduction in recent years of optical amplifiers with wide wavelength operating range in the 1520 to 1580 nm spectral region into fiber communication systems has enabled the practice of dense wavelength division multiplexing (DWDM). In DWDM systems a group of sixteen or even as many as sixty four wavelengths are simultaneously transmitted in a fiber, each wavelength being modulated by a data stream as fast as 10 Gb/s. Such high capacity communication systems consist of optical transmitters, cabled fiber, optical amplifiers, wavelength multiplexers and optical receivers and need to be closely monitored to detect any malfunction that may corrupt the information transmission. The bit error rate (BER) is a measure defined as the number of errored bits divided by the total number of bits received in a given time period. The BER is sensitive to several parameters of the transmission system, such as the optical power at the receiver, the quality of the transmitter, but particularly to the ratio of signal power to noise power, known as the signal to noise ratio (SNR) at the receiver. In turn, the SNR is determined by the addition of receiver thermal noise shot noise and noise added by optical amplifiers in the system.

One of the most important parameters of optical amplifiers is the gain at the various wavelengths. For proper operation the receivers operating at the various wavelengths expect a common and substantially equal optical signal to noise ratio as well as substantially equal optical power. Since transmitters generally output substantially equal amounts of power at various wavelengths, the amplifiers in the system are expected to provide equal gain at the various channel wavelengths.

Several methods of equalizing or flattening the gain of optical amplifiers have been explored in the literature. The book titled "Erbium Doped Optical Amplifiers" by Emmanuel Desurvire discusses such gain flattening techniques on pp. 480. The article, "Flat-gain amplifiers and transmission in WDM networks," paper FA1-1 presented at the "Optical amplifiers and their applications" conference by Bertrand Clesca also compares gain flattening techniques. In Erbium doped fibers the gain at any given wavelength has contributions from several broadened atomic resonances. Each of these resonances is centered at a slightly different wavelength in the 1520 to 1580 nm range and originates from a different pair of Stark sublevels of the Erbium ion electronic energy levels. The material of the glass matrix containing the Erbium, as well as dopants in that matrix, affect the position and broadening of the atomic resonances in Erbium. One of the known techniques for flattening the gain curve is the use of aluminum co-doping of Erbium doped fiber. Another technique utilizes fluoride glass instead of silica glass as the fiber material. The use of fluorozirconate glasses for example is well known to yield flatter gain over wavelength when doped with Erbium. Fluorozirconate based doped fibers are available from Galileo Corporation of Sturbridge, Mass. The drawback of fluoride fibers has been their low melting point, making them very difficult to manufacture and splice with other fibers in a system and their hygroscopic nature, making them susceptible to damage by humidity.

Yet other techniques insert specially shaped spectral filters in line with the amplifiers to compensate for the difference in gain at different wavelengths. U.S. Pat. No. 5,050,949, by Di Giovanni and Giles, describes the use of two stage fiber amplifiers to achieve flattened gain. The drawback of the two stage approach is that it still lacks enough suppression of the gain in the 1520 to 1535 nm spectral region to achieve the desired degree of flatness.

More recently, U.S. Pat. No. 5,557,442 by Huber describes a technique involving the use of a circulator, a series of fiber Bragg reflectors imprinted into a fiber and a set of attenuators to achieve gain flattening. Circulators are optical devices with three or more fiber ports that channel the light from port I into port I+1. Bragg gratings are periodic index of refraction gratings imprinted into the fiber core by UV light and reflect fiber propagating light at specific wavelengths matching the periodicity of the gratings. In U.S. Pat. No. 5,557,442, the light enters the amplifier, then the circulator, and is channeled into the chain of Bragg reflectors and attenuators. The light at a first wavelength $w_1$, which experiences little gain in the amplifier, is reflected from the first Bragg grating and thus suffers no attenuation before returning to the circulator and being channeled out. Light at a second wavelength $w_2$, which experiences somewhat higher gain than $w_1$, is reflected by a subsequent Bragg grating and thus has to go through one or more attenuators before it returns to the circulator and gets channeled out. Light at a wavelength $w_3$, experiencing the highest gain in the amplifier, is reflected back by the last Bragg grating in the fiber, thus forcing it to go through the whole attenuator chain twice before it reaches the circulator and gets channeled out.

The main drawback of the Huber patent is that it requires complex variable attenuators to adjust the amount of loss dynamically to correct for changes in the gain of the amplifier that are due to input power changes. Other dynamic methods of controlling the gain which are responsive to variations in the input power to the amplifier have also been proposed in the literature. U.S. Pat. No. 5,088,095 to Zirngibl for example teaches the use of a counter propagating light beam to clamp the gain. However, this method reduces the useful power available from the amplifier due to the transfer of power to the back propagating light beam and achieves little flattening of the gain.

It is therefore apparent from examining the prior art that a method of flattening the amplifier gain over wavelength that is responsive to variations in input power is needed.

A first objective of this invention is to provide a method of equalizing or flattening the gain of a doped fiber amplifier over wavelength without affecting the optical properties of the amplifier such as average gain and noise figure.

A second objective of the present invention is to flatten the gain of an amplifier independently of the input power level to the amplifier.

SUMMARY OF THE INVENTION

The optical gain in a rare earth doped fiber at a specific wavelength is a composite sum with contributions from several transitions of electrons between Stark sublevels within two main multiplicities of levels or manifolds. For example, if the gain atom had only two Stark sublevels with energies $e_2$ and $e_1$ the gain would basically be equal to the product of the electronic transition probability $\sigma_{12}$ between the specific sublevels, times the difference in number of electrons in the two sublevels $(p_2-p_1)$, times a resonance function that is smaller when the frequency of the light is further from being resonant with the energy difference $e_2-e_1$. Such resonant function is usually a Gaussian shape mathematically written as $\exp\{-h\omega-(e_2-e_1)\}$, where $\omega=2\pi c/\lambda$ and h is Plank's constant. Each transition between a pair of Stark sublevels is resonant with a different wavelength, the resonance condition being $h\omega=2\pi(e_2-e_1)$.

Because most atoms such as rare earth atoms (Erbium, Neodymium, Praseodymium, etc.) have a multitude of Stark sublevels, the gain at any wavelength is a composite sum with contributions from many level pairs. Past efforts in the prior art to shape the gain have focused on changing the transition probabilities $\sigma_{ij}$ by utilizing the influence of the glass matrix containing the rare earth ions.

In this invention we recognize that making the Stark sublevels with high transition probability $\sigma_{ij}$ have a proportionately low population will yield a substantially constant gain coefficient over a limited wavelength range. The shaping of the population p(j) in a sublevel is achieved by selective pumping of the Stark sublevel j utilizing one or more pump lasers at appropriate wavelengths that dynamically redistribute the electrons within a Stark manifold of the ground or excited energy levels of the rare earth ions. In one embodiment, two lasers are used to transfer electrons between Stark sublevels of the same electronic level manifold via a two step process known as a two-photon transition, first taking the electrons to a higher manifold then returning them to a different Stark sublevel in the starting manifold. Physically this redistribution process via optical pumping is equivalent to raising the temperature of the electrons in the manifolds to a very high temperature, causing them to more equally distribute among the Stark sublevels. In a second embodiment, electrons from a sublevel in the upper amplifier manifold are transferred out by action of a single pump laser to a higher energy manifold from whence they decay to the ground state.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
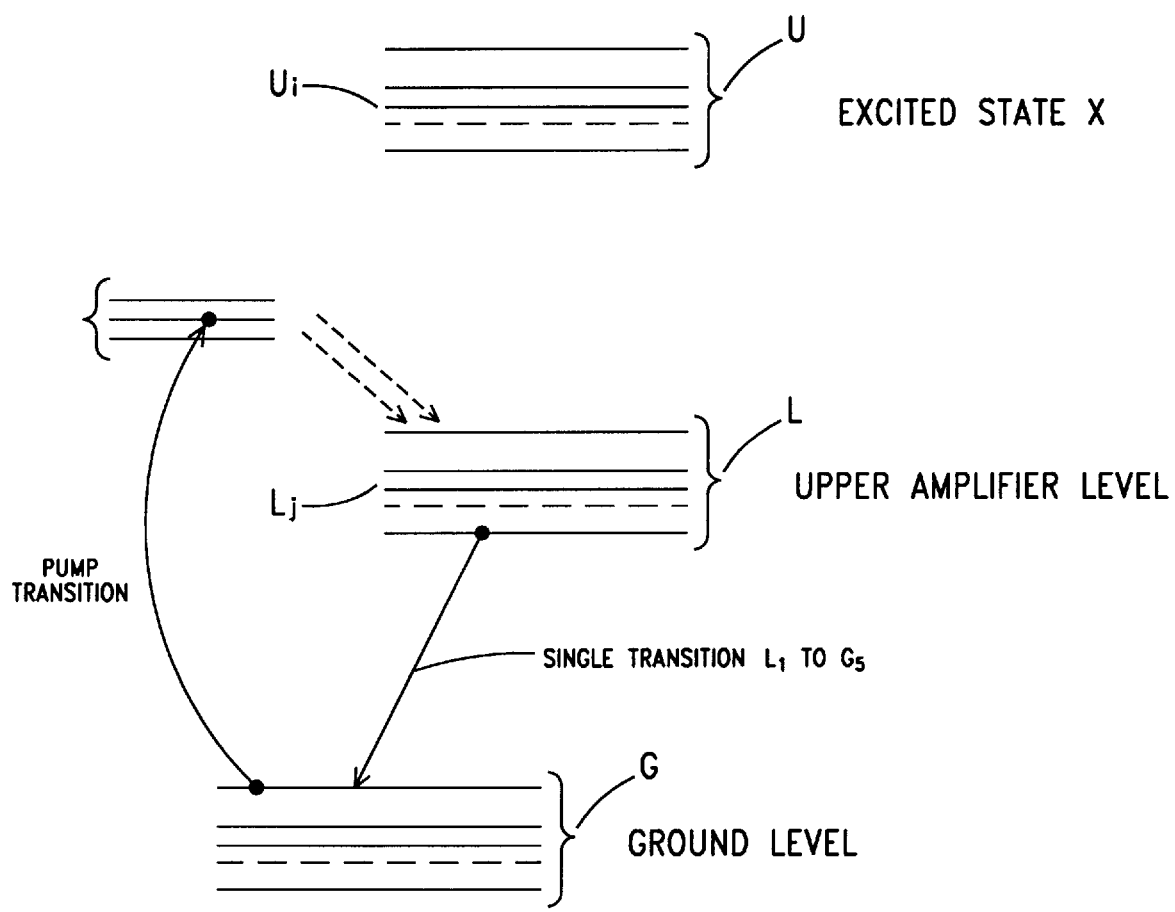
FIG. 1 shows a schematic representing four electronic energy levels involved in light amplification in a rare earth ion.

Referring to FIG. 1, there is shown a schematic representation of four of the energy levels in an atom providing laser amplification. The vertical position of each level is representative of that level's energy. Each level comprises a multiplicity of sublevels known as a Stark manifold. The ground energy level is labeled G, the laser level is labeled L, the pump level is labeled P and a higher energy level is labeled U. Light induced electron transitions are shown by curved arrows joining the originating and ending energy levels. Phonon induced, or vibrationally induced, transitions are shown by dashed arrows. Sublevels within each level are labeled with an integer such as i or j. The energy of a sub level j is $e_j$. Electrons are traditionally pumped by a pump laser from the ground state G to the pump level P from where they decay to the upper laser level L and populate all sublevels $L_i$. The normal thermal distribution p(ij) of electrons in the $L_i$ sublevels is given by:

$$p(i,j)=\exp\{-(e_j-e_i)/kT\}/\Sigma_{ij}\exp[-(e_j-e_i)/kT]$$

where $e_i$ is the energy of the ith level relative to the ground level, k is Boltzmann's constant and T the absolute temperature.

Defining $\lambda$ as the wavelength and $\omega=2\pi/\lambda$ as the optical frequency, the gain per unit length $G(\omega)$ as a function of optical frequency is given by:

$$G(\omega)=\sigma_e N_2-\sigma_1 N_1 \qquad (1)$$

wherein $N_1$ and $N_2$ are the average electron populations in the ground and upper laser levels respectively, and $$\sigma_a=h\nu\Sigma_{ij}\sigma_{ij}g(i,j)p(1,j);$$

$$\sigma_e=h\nu\Sigma_{ij}\sigma_{ij}g(i,j)p(i,2); \qquad (2)$$

$$g(i,j)=\exp\{-(e_j-e_i-h\omega/2\pi)\}.$$

The $\Sigma$ symbols signify summation over the level indices and the sums are carried over all sublevel pairs (i, j) with the ith level being from the ground level manifold and jth level from the excited level manifold, $\nu=\omega/2\pi$ and $\sigma_{ij}$ are the normalized electron transition cross sections.

Figure 2:
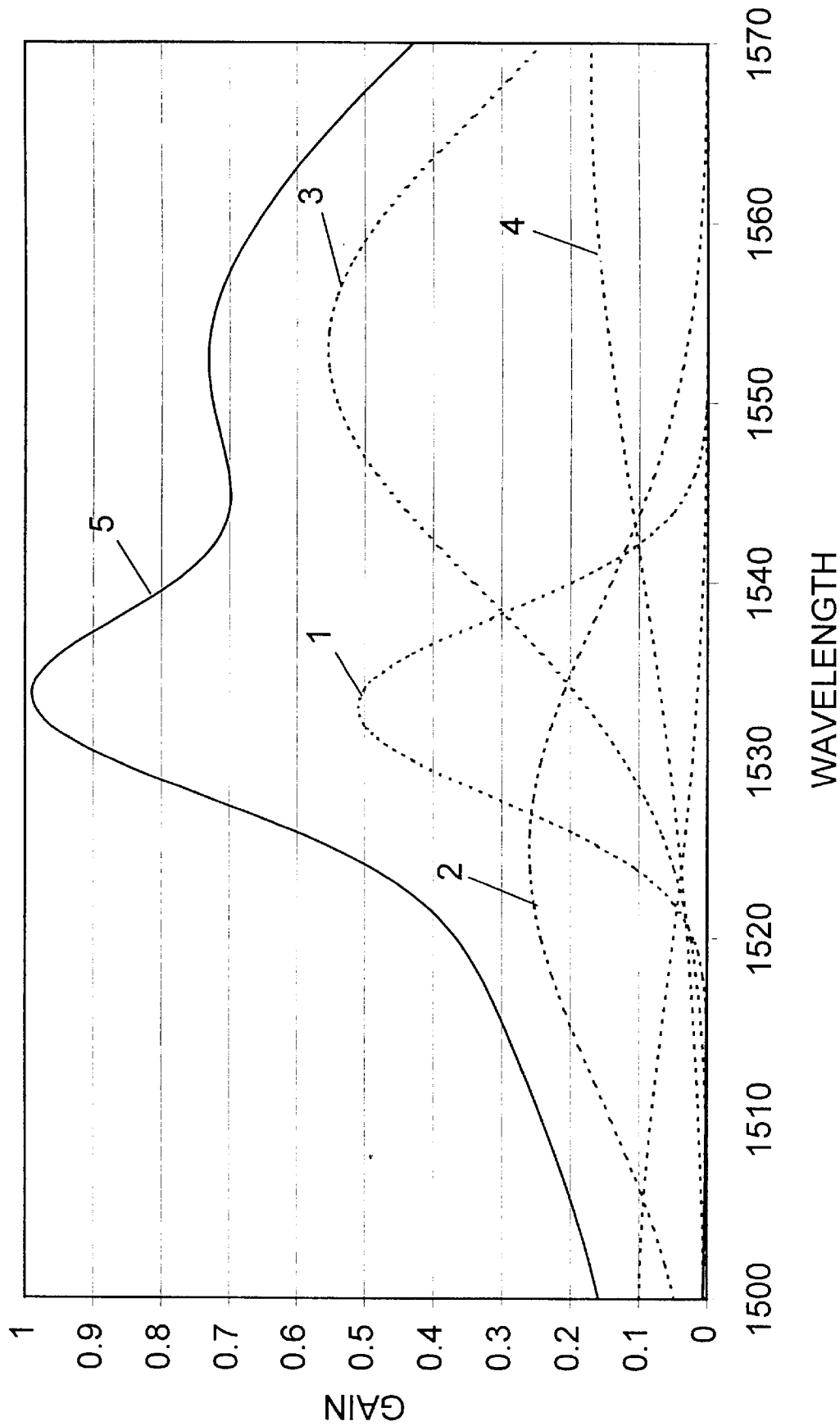
FIG. 2 shows a graph of the composite non flat gain resulting from the combination of contributions from several electronic transitions in Erbium ions in a glass matrix.

Referring to FIG. 2, there is shown a graph of the gain over wavelength in the wavelength range 1520 to 1560 nm, resulting from pumping Erbium ions in a glass matrix with a pump laser. Erbium is used here as an example of a more general class of dopant ions that could be utilized in an amplifying system. FIG. 2 shows four dashed line curves labeled 1 through 4. Each of the curves 1 to 4 represents a gain contribution from a specific pair of energy levels in the Erbium ion. The full line curve 5 is the graph of the total composite gain, which is the sum of the contributions from all four pairs of energy sublevels. Curve 5 is representative of the gain $G(\omega)$, written above in Eq. (1). The gain is seen to be substantially higher in the 1530 nm wavelength region.

Making the sum $\Sigma_{ij}\sigma_{ij}g(ij)p(1,j)$ in Eq. (2) independent of $\omega$ yields a substantially constant gain coefficient over a wavelength range, such as 1530 to 1560 nm. This is achieved by shaping the function p(ij) to be substantially the same for all sublevels j. The shaping of the population p(ij) is achieved by selective pumping of the Stark sublevels utilizing one or more pump lasers that dynamically re-distribute the electrons within a Stark manifold of the ground or excited energy levels of the rare earth ions.

Figure 3:
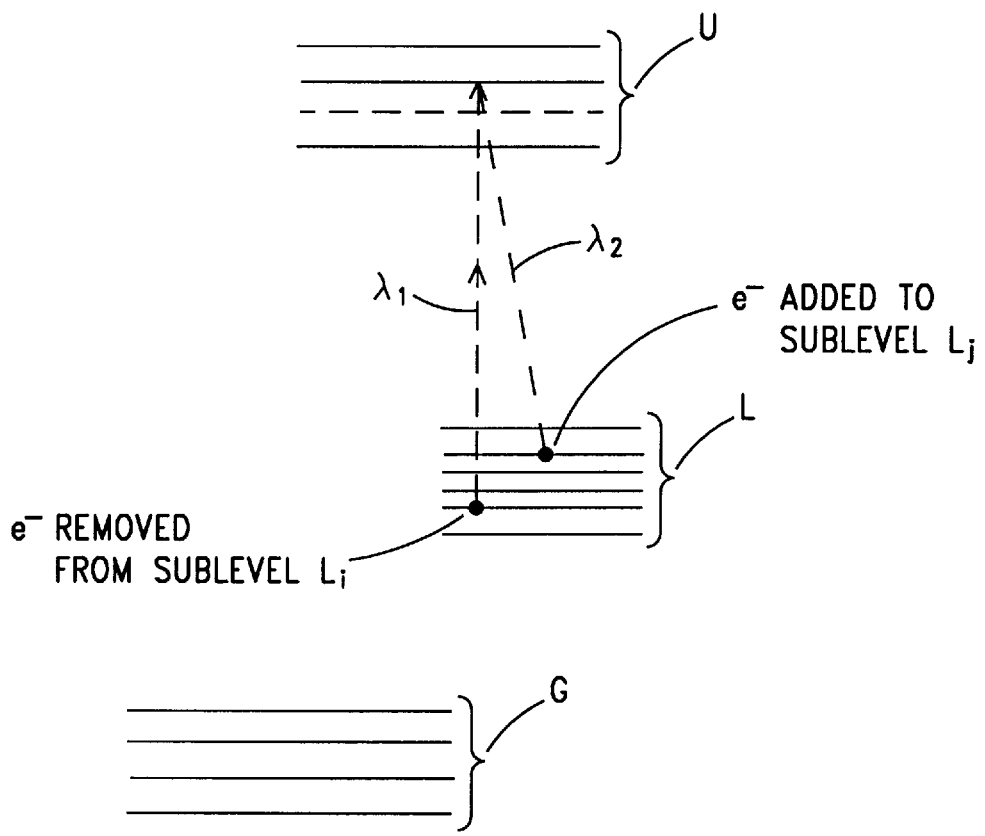
FIG. 3 shows a schematic illustrating the type of double electronic transition utilized in this invention to redistribute electrons among Stark sublevels.

Referring to FIG. 3, there is shown the process of removing an electron from sublevel $L_i$ to an upper level U with the help of a photon at wavelength $\lambda_1$ and further returning the electron to a sublevel $L_j$ by means of a photon at wavelength $\lambda_2$. The main reason for utilizing two photons rather than a direct transition $L_i$ to $L_j$ is that it is generally difficult to find a pump laser at the proper wavelength needed to cause an $L_i$ to $L_j$ transition. There is a large number of choices of wavelengths $\lambda_1$ and $\lambda_2$ such that the difference of the corresponding energies matches the energy difference $e_i-e_j$; therefore, it is easier to find a pair of pump lasers to effect the desired transition.

The choice of $\lambda_1$ and $\lambda_2$ is made even wider by noting that the intermediate electron energy need not correspond to a real level U. It is well known in the art that two-photon processes with virtual intermediate states are physically allowed albeit with reduced quantum probabilities. The physical probability of such two-photon transitions increases dramatically when the intermediate electron energy is close to a real level U. Such nonresonant two-photon transitions have been used to produce light and amplify light in what is known in the literature as Raman type amplifiers.

Figure 4:
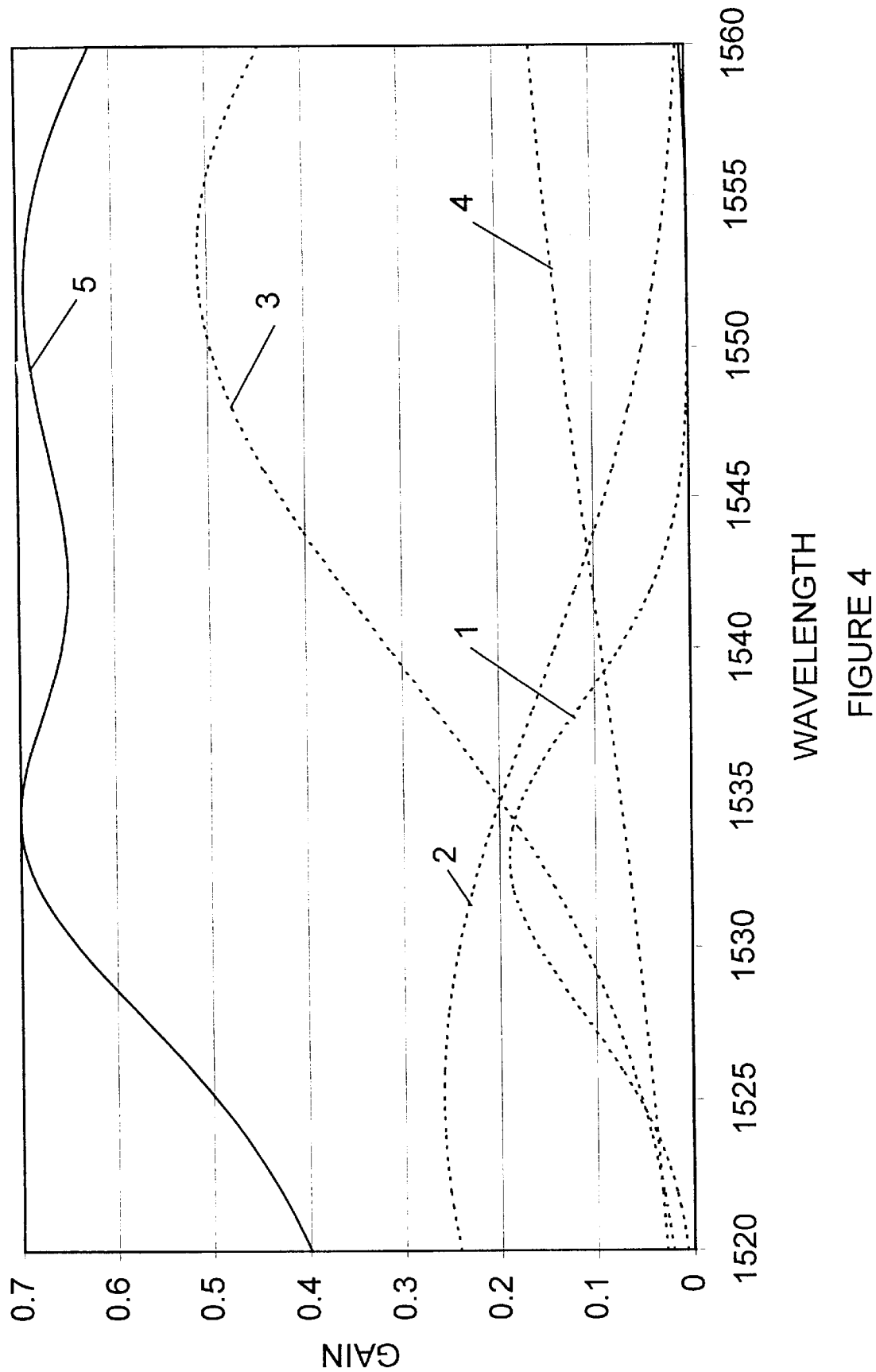
FIG. 4 shows a graph of the flattened composite gain in an Erbium doped fiber according to the present invention.

By reducing the population of the Stark sublevel that produces curve 1 in FIG. 2 to arrive at the curve 1' in FIG. 4, the overall gain curve 5 is modified to 5' as shown in FIG. 4, where the variation of gain over wavelength is greatly reduced.

Figure 5:
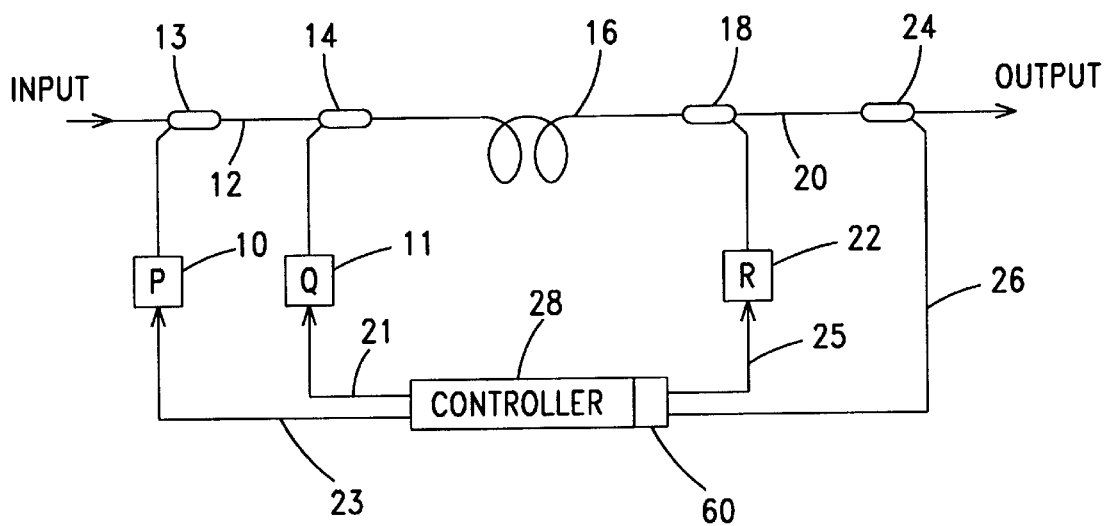
FIG. 5 shows a schematic of a first physical embodiment of the present invention.

Referring now to FIG. 5, there is shown a first embodiment of this invention in which the signal carrying light enters into the amplifier via a fiber 12 and is combined with light from the first pump laser 10 by means of a wavelength sensitive combiner 13. The output of the combiner 13 is further combined with light from a second pump laser 11 by means of a second combiner 14 and the sum of all three lights (the signal light, the first pump light, and the second pump light) enters the doped gain fiber 16. At the other end of the fiber 16, a third pump laser 22 sends light at wavelength $\lambda_2$ into the doped fiber 16 via a third combiner 18. The amplified signal exits the amplifier via a fiber 20. The first pump laser 10 pumps the electrons into the pump level P. The second pump laser 11 at wavelength $\lambda_1$ removes electrons from sublevel $L_i$ to U and the third laser 22 at wavelength $\lambda_2$ transfers electrons from U to $L_j$. The two step process described is known as a two-photon transition. A fiber coupler 24 taps a small fraction of the output light into fiber 26 which channels the light to a controller 28. The controller 28 contains the necessary filters or spectrum analyzer to assess the gain flatness at the output. Such a spectrum analyzer is described in a patent application by the present author titled, "Method of Monitoring the Input and Output of an Optical Amplifier," Ser. No. 08/593,899, filed Jan. 30, 1996, and herein incorporated by reference. The controller 28 may incorporate current and temperature control for the pump lasers as described in U.S. Pat. No. 5,594,748, herein incorporated by reference. The controller 28 is linked to the pump lasers 10 and 11 via electrical wires 23 and 21 respectively and controls laser current and temperature. The temperature control enables the fine tuning of the wavelengths of the pumps required to selectively depopulate specific Stark sublevels. A fourth leg of the input combiner 13, not shown in FIG. 5 for clarity, may be utilized to monitor the input power to the amplifier and enable the controller 28 to accordingly adjust the pump laser powers or wavelengths. Any combination of combiners and their associated optical fibers are referred to herein as a light-guiding device. The additional pump lasers (e.g., the pump lasers 11 and 22) and their associated light-guiding devices are referred to as an electron population redistribution system.

In the following text, whenever specific atomic examples are given, the classical spectroscopic notation for atomic energy levels will be used, wherein an uppercase character such as S, H, I denotes the orbital angular momentum of an atomic level, a superscript denotes its spin angular momentum and a subscript denotes its total angular momentum as in $^4I_{13/2}$. A level with an angular momentum J, has 2J+1 Stark sublevels and will be referred to as a manifold.

As a specific example of the realization of this invention, a 980 nm laser is utilized to pump Erbium ions in a glass fiber to the $^4I_{11/2}$ level from where they decay to the $^4I_{13/2}$ upper laser level. A second pump laser at a wavelength of 850 nm is used to transfer the electrons from the lowest energy sublevel in the $^4I_{13/2}$ manifold, located at an energy 6540 cm$^{-1}$ above the ground level, to the $^4S_{3/2}$ manifold. A third laser at a wavelength of 855 nm is used to transfer electrons from $^4S_{3/2}$ to the second energy level in the $^4I_{13/2}$ manifold at 6644 cm$^{-1}$. Other choices of lasers at 514 nm, 630 nm, 715 nm, 790 nm, 850 nm, 1140 nm and 1680 nm to name a few are also possible, each leading from $^4I_{13/2}$ to a different upper level U. Other rare earth ions used in an amplifying fiber, such as Neodymium and Praseodymium, require different choices of pump laser wavelengths. Neodymium, for example, requires a 1060 nm primary pump.

In a second embodiment of this invention electrons from a sublevel $L_i$ in the upper amplifier manifold L are transferred out by action of a single pump laser to a higher energy manifold U from whence they decay to the ground state. This results in reducing the population of sublevel $L_i$ which is chosen to be a sublevel with high transition probability. In this case only two pump lasers are utilized, a first pump to populate the laser upper level L and a second laser to selectively de-populate the sublevel with high gain contribution.

Figure 6:
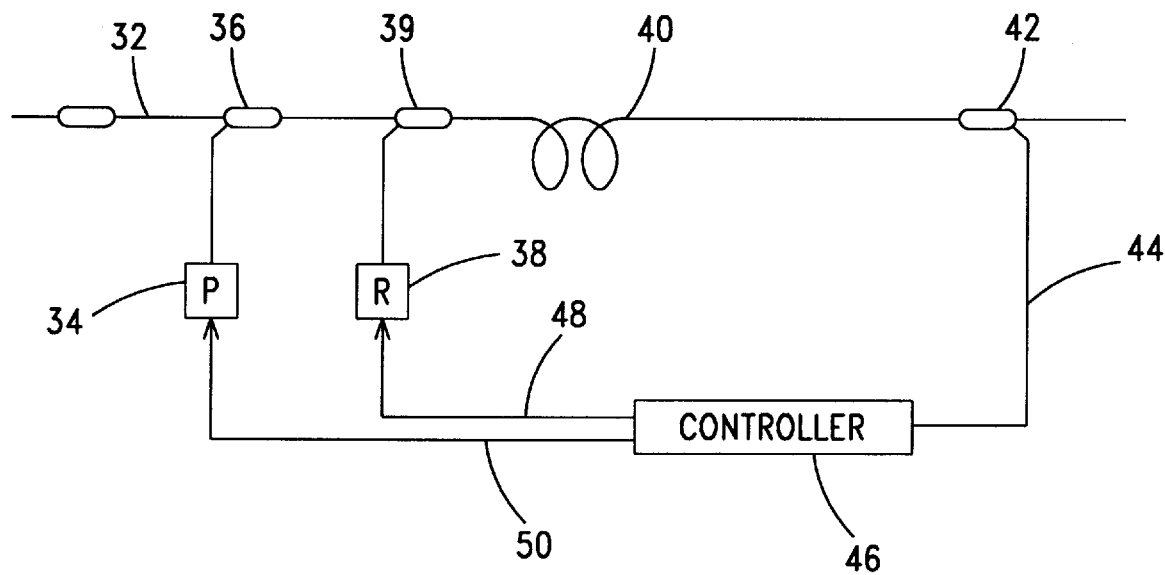
FIG. 6 shows a schematic of a different embodiment of the present invention.

Referring to FIG. 6, there is shown a schematic of the second embodiment of this invention wherein the signal light enters the amplifier via fiber 32 and is combined with pump light from a first pump laser 34 by means of a combiner 36. The combined light beams are further combined with the light from a second pump laser 38 by means of a second combiner 39 and enter the amplifying fiber 40. A low loss coupler 42 taps a small fraction of the light output of the amplifier and sends it to a spectrum analyzer 60 within a controller 46. Such a spectrum analyzer is described in a patent application by the present author titled "Method of Monitoring the Input and Output of an Optical Amplifier" Ser. No. 08/593,899 filed Jan. 30, 1996, herein incorporated by reference. The controller 46 may incorporate current and temperature control for the pump lasers as described in U.S. Pat. No. 5,594,748, herein incorporated by reference. The controller 46 is linked to the pump lasers 34 and 38 via electrical wires 50 and 48 respectively and controls laser current and temperature. The temperature control enables the fine tuning of the wavelength of the pump required to selectively depopulate specific Stark sublevels. An input coupler, not shown in FIG. 6, may also be used to monitor the input power to the amplifier and enable the controller to adjust the pump lasers accordingly.

Multiple pump lasers could be used to control the populations of all Stark sublevels in the upper manifold; however, a good choice of pump lasers should limit the required pumps to one or two. In fact it is possible to utilize a single pump laser to populate the upper laser level L as well as transfer the electrons up to higher levels. The objective is to find laser wavelengths that match the desired energy level transitions. As a specific example, in the case of an Erbium doped silica glass fiber a laser with a wavelength in the 800 to 830 nm range can be utilized to pump electrons from the $I_{15/2}$ ground state to the $I_{9/2}$ pump level from which the electrons naturally decay to the $I_{13/2}$ upper laser level. The same 820 nm laser can then re-excite the electrons to a higher level $S_{3/2}$.

The power settings and wavelengths required to achieve flat gain are predetermined in the design and development process and such parameters are stored in the memory of the controller 28 or 46 controlling the device to achieve proper operation.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, other configurations of the pumps are possible, including placing pumps at the input side of the doped fiber, at the output side of the doped fiber, or at both positions.

What is claimed is:

1. An optical amplifier, comprising:

a pump laser;

a light amplifying medium doped with an active gain element having an electronic ground level, a lower laser level, an upper laser level and a multiplicity of higher energy electronic levels;

a light guiding device for simultaneously guiding light from the pump laser and input signal light into the amplifying medium;

an electron population redistribution system including at least one additional pump laser configured to selectively transfer electrons from one Stark sublevel to a second Stark sublevel of the electronic energy levels of the active gain element via at least one 2-photon Raman transition comprising a first transition from the one Stark sublevel to a second level and a second transition from the second level to the second Stark sublevel, a first level different from the second level including the first and second Stark sublevels, and at least one additional light guiding device for guiding the light from the additional pump lasers into the amplifying medium.

2. The optical amplifier of claim 1, wherein the electron redistribution system is configured to adjust the gain profile of the optical amplifier over wavelength by selectively adjusting the electron population of at least one Stark sublevel of the electronic energy levels of the active gain element, the at least one Stark sublevel being selected from the set comprising the lower and upper laser levels.

3. The optical amplifier of claim 2, wherein the electron redistribution system is configured to flatten the gain profile of the optical amplifier.

4. The optical amplifier of claim 1, wherein the at least one additional pump laser comprises two pump lasers operating at first and second optical wavelengths respectively such that the difference between the photon energies of the first and the second wavelengths is close to the energy difference between a pair of Stark sublevels.

5. The optical amplifier of claim 4, wherein the pair of Stark sublevels is chosen from the set of electron levels of the upper laser level of the active gain element.

6. The optical amplifier of claim 4, wherein the first optical wavelength is selected from one of the ranges: 504 to 525 nm, 600 to 650 nm, 700 to 750 nm, 750 to 820 nm, 1110 to 1170 nm, 1650 to 1700 nm, and where the second optical frequency corresponds to a wavelength selected from one of the ranges: 504 to 525 nm, 600 to 650 nm, 700 to 750 nm, 750 to 820 nm, 1110 to 1170 nm, 1650 to 1700 nm.

7. The optical amplifier of claim 1, wherein the at least one additional pump laser comprises one pump laser operating at a wavelength selected to cause electron transitions from a selected Stark sublevel in the upper laser level to a higher energy level.

8. The optical amplifier of claim 1, wherein the light amplifying medium is an optical fiber, the active gain element in the fiber is Erbium oxide, the pump laser wavelength is one of the set comprising 980 nm and 1480 nm, and the additional pump laser wavelengths are chosen from the set comprising the ranges 504 to 525 nm, 600 to 650 nm, 700 to 750 nm, 750 to 820 nm, 820 to 870 nm, 1110 to 1170 nm and 1650 to 1700 nm.

9. The optical amplifier of claim 1, wherein the light amplifying medium is an optical fiber, the active gain element in the fiber is chosen from the set comprising Neodymium, Praseodymium, Holmium, Thulium, and Ytterbium oxides, and the pump laser wavelength is close to one of the set comprising 490 nm, 520 nm, 550 nm, 910 nm, 1015 nm, 1060 nm.

10. The optical amplifier of claim 1, wherein the electron population redistribution system further comprises a controller capable of monitoring at least one of the amplifier input and output powers and adjusting the pump lasers power and wavelength so as to achieve a desired gain profile.

11. The optical amplifier of claim 10, wherein the controller comprises an optical spectrum analyzer configured to monitor the output of the optical amplifier.

12. The optical amplifier of claim 10, wherein the controller comprises a set of optical filters configured to monitor the output of the optical amplifier.

13. An optical amplifier, comprising:

a light amplifying medium doped with an active gain element having an electronic ground level, a lower laser level, an upper laser level and a multiplicity of higher energy electronic levels;

a pump laser having a wavelength selected so as to simultaneously cause electron transitions from the ground level of the active gain element to one of the higher energy levels and electron transitions from a selected Stark sublevel of the upper laser level to a yet higher energy level; and a light guiding device for simultaneously guiding light from the pump laser and input signal light into the amplifying medium.

14. The amplifier of claim 13, wherein the light amplifying medium is an optical fiber, the active gain element in the fiber is Erbium oxide, and the pump laser wavelength is in one of the set of ranges comprising 960 to 990 nm, 800 to 850 nm, 630 to 670 nm, 500 to 530 nm.

15. The amplifier of claim 14, wherein the light amplifying medium is an optical fiber, the active gain element in the fiber is chosen from the set comprising Neodymium, Praseodymium, Holmium, Thulium, and Ytterbium oxides, and the pump laser wavelength is close to one of the set comprising 490 nm, 520 nm, 550 nm, 910 nm, 1015 nm, 1060 nm.

16. In an optical amplifier including a pump laser, a light amplifying medium doped with an active gain element having an electronic ground energy level, a lower laser energy level, an upper laser level and a multiplicity of higher energy electronic levels, each electronic level having a multiplicity of energy sublevels, and a light guiding device for simultaneously guiding light from the pump laser and input signal light into the amplifying medium, a method of controlling the sublevel electron populations, comprising the step of:

causing transitions between the sublevels of one of the levels via at least one two photon Raman transition comprising a first transition from a first Stark sublevel in the one level to a second level and a second transition from the second level to a second Stark sublevel in the first level, the one level being different from the second level.

17. The method of claim 16, further comprising the step of adjusting the gain profile of the optical amplifier over wavelength by selectively controlling the electron populations of at least one Stark sublevel of the electronic energy levels of the active gain element, the at least one Stark sublevel being selected from the set comprising the lower and upper laser levels.

18. The method of claim 17, wherein the step of adjusting the gain profile of the optical amplifier comprises flattening the gain profile of the optical amplifier.

19. The method of claim 18, wherein the light amplifying medium is an optical fiber, the active gain element in the fiber is Erbium oxide, and the pump laser wavelength is one of the set comprising 980 nm and 1480 nm.

20. In an optical amplifier including a pump laser, a light amplifying medium doped with an active gain element having an electronic ground energy level, a lower laser energy level, an upper laser level and a multiplicity of higher energy electronic levels, each the electronic level having a multiplicity of energy sublevels, and a light guiding device for simultaneously guiding light from the pump laser and input signal light into the amplifying medium, a method of controlling the sublevel populations, comprising the step of:

causing transitions between the sublevels of one of the levels via a single photon transition from a first Stark sublevel in the one level to a second level and a decay from the second level to a second Stark sublevel in the one level, the one level being different from the second level.

21. The method of claim 20, further comprising the step of adjusting the gain profile of the optical amplifier over wavelength by selectively controlling the electron populations of at least one Stark sublevel of the electronic energy levels of the active gain element, the at least one Stark sublevel being selected from the set comprising the lower and upper laser levels.

22. The method of claim 21, wherein the step of adjusting the gain profile of the optical amplifier comprises flattening the gain profile of the optical amplifier.

23. The method of claim 22, wherein the light amplifying medium is an optical fiber, the active gain element in the fiber is Erbium oxide, and the pump laser wavelength is one of the set comprising 980 nm and 1480 nm.

24. The method of claim 20, wherein the step of causing single photon transitions between the sublevels comprises operating the pump laser at a wavelength selected so as to simultaneously cause electron transitions from the ground level of the active gain element to one of the higher energy levels and electron transitions from a selected Stark sublevel of the upper laser level to a yet higher energy level.

25. The method of claim 24, wherein the light amplifying medium is an optical fiber, the active gain element in the fiber is Erbium oxide, and the pump laser wavelength is in one of the set of ranges comprising 960 to 990 nm, 800 to 850 nm, 630 to 670 nm, 500 to 530 nm.

* * * * *